United States Patent [19]
Hale et al.

[11] Patent Number: 6,012,678
[45] Date of Patent: Jan. 11, 2000

[54] GALLEY VACUUM WASTE DISPOSAL SYSTEM

[75] Inventors: William D. Hale, Mill Creek; Umesh L. Nisargand, Bellevue, both of Wash.; William E. Dutcher, Jr., Cambridge, Mass.

[73] Assignee: The Boeing Company, Seattle, Wash.

[21] Appl. No.: 09/013,386

[22] Filed: Jan. 26, 1998

[51] Int. Cl.[7] .................................................. B64D 11/00
[52] U.S. Cl. ............................... 244/118.5; 4/431; 4/662
[58] Field of Search .......................... 244/118.5; 417/148, 417/118; 4/662, 431, 250, 432, 209 R, 477, 433, 391, 449

[56] References Cited

U.S. PATENT DOCUMENTS

| | | |
|---|---|---|
| 1,150,862 | 8/1915 | Hardin . |
| 1,343,287 | 6/1920 | Shafer . |
| 4,376,314 | 3/1983 | Iwans . |
| 5,165,457 | 11/1992 | Olin et al. . |
| 5,400,446 | 3/1995 | Bloemer et al. . |

FOREIGN PATENT DOCUMENTS

| | | | |
|---|---|---|---|
| 530859 | 3/1993 | European Pat. Off. | ............ 244/118.5 |
| 2054688 | 2/1981 | United Kingdom | ................ 244/118.5 |
| 2166542 | 5/1986 | United Kingdom | ................ 244/118.5 |

*Primary Examiner*—Peter M. Poon
*Assistant Examiner*—Tien Dinh
*Attorney, Agent, or Firm*—Christensen O'Connor Johnson & Kindness PLLC

[57] ABSTRACT

A galley vacuum waste disposal system is provided to facilitate the transport of galley waste. The system includes a basin for depositing waste. The basin is connected to a drain line coupled to a flush valve, leading to an existing sewage waste storage tank of an existing sewage waste system on an airplane. A manually operated flush switch signals a flush control unit to activate the flush valve, allowing the galley waste to be transported from the basin through the drain line and into the existing waste tank.

9 Claims, 1 Drawing Sheet

GALLEY VACUUM WASTE DISPOSAL SYSTEM

FIELD OF THE INVENTION

The present invention relates generally to waste disposal systems and, more particularly, to waste disposal systems on aircraft.

BACKGROUND OF THE INVENTION

On airplanes, a need for disposal of galley waste matter arises. One solution involves the storage of liquid and solid waste in a compartment. This solution creates many problems including leakage, odors, and corrosion.

Another current solution involves separating liquid waste from solid waste, pouring the liquid waste down a sink, and storing the solid waste in a waste compartment. However, the separation process is messy, time-consuming, and is an undesirable task for flight attendants. In addition, galley sinks drain through relatively small diameter tubing which can lead to clogging when certain liquid mixtures having residual solids, such as coffee grounds, are poured into the sink.

Yet another way for flight attendants to dispose of galley waste is to flush the galley waste matter down the toilets. However, having flight attendants who serve food regularly enter lavatories to dispose of galley waste raises health concerns and also presents an undesirable image to airplane passengers.

Accordingly, it is an object of this invention to eliminate the problems of leakage, odors, and corrosion in connection with the disposal of waste.

It is another object of this invention to eliminate the need for flight attendants to separate solid waste and liquid waste and to enter lavatories for waste disposal.

It is yet another object of this invention to reduce costs by utilizing an existing ventilation system and an existing sewage waste system.

SUMMARY OF THE INVENTION

A galley vacuum waste disposal system is contained in an acoustically insulated enclosure. A door, located on the top or on the side of the enclosure, provides access to a basin into which waste is deposited. The base of the basin is connected to a waste drain line coupled to a motorized flush valve which leads into a sewage waste storage tank of an existing vacuum sewage waste system.

A manually operable flush switch signals a flush control unit to activate the motorized flush valve and to place the flush valve in an open position during a flush. In the open position, the flush valve allows the waste to be transported from the basin into the drain line leading to the waste tank under the influence of the vacuum sewage waste system.

A rinse line connecting a water supply to the basin may be included. A rinse valve interfacing the flush control unit is coupled to the rinse line. During flushing, the flush control unit activates the rinse valve which sprays rinse water from the water supply through the rinse line and into the basin. The rinse water is drained through the drain line.

During a flush, an air source connected to the enclosure by a supply duct supplies air at a high flow rate to provide makeup air that replaces the waste material and surrounding air drawn into the vacuum waste system. In addition, an existing ventilation system connected to the enclosure by an exhaust duct continuously draws air from the enclosure to remove gases and odors. A pneumatic or mechanical check valve can be coupled to the exhaust duct to prevent the backflow of air during a flush.

In accordance with more detailed aspects of this invention, a switch connected to the top side of the enclosure and interfacing the flush control unit prevents flush activation when the door is in the open position. In addition, manual shut-off valves can be coupled to the rinse line and the drain line for use in the case of failure of the flush valve or the rinse valve.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawing, wherein.

DETAILED DESCRIPTION OF THE INVENTION

Figure 1:
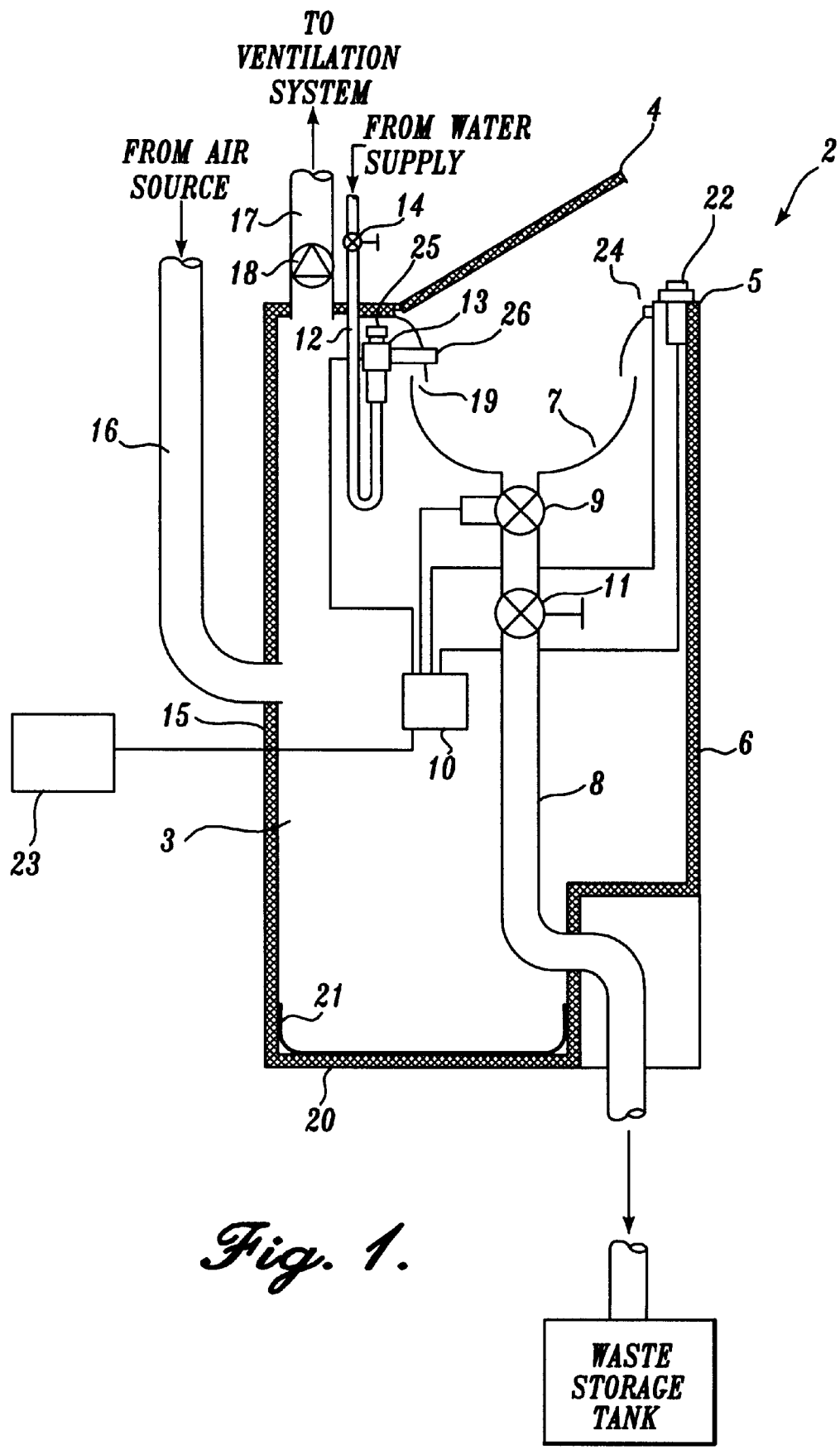
FIG. 1 is a schematic diagram of a galley vacuum waste disposal system constructed in accordance with the present invention.

The present invention provides a galley vacuum waste disposal system 2 which connects to a sewage waste storage tank of a sewage waste system on an airplane. Existing sewage waste systems on airplanes use two-inch diameter tubing and high airflow rates to transport conventional sewage effluent to a storage tank. Therefore, clogging of the conventional system by galley waste is unlikely.

As shown in FIG. 1, the galley vacuum waste disposal system 2 is contained in an acoustically insulated enclosure 3 with envelope dimensions corresponding to a standard galley waste storage cart or halt cart to minimize the impact of installation. A door 4 is located on a top side 5 of the enclosure 3 as shown in FIG. 1 or may be located on a front side 6, inboard side or outboard side of the enclosure 3. The door 4 is hinged for upward swinging movement to provide access to a basin 7 into which waste is deposited. The bottom of the basin 7 is connected to a waste drain line 8. A motorized flush valve 9 is interposed in the drain line, and is interfaced with a flush control unit 10. The flush valve 9 may be any of a variety of conventional motorized valves, such as a solenoid or electrical motor operated valve. A manual shut-off valve 11 may be coupled to the drain line 8 downstream of the flush valve 9, for use in case of the failure of the flush valve 9 in an open position. The drain line 8 leads from the valves to the waste storage tank of the existing vacuum sewage waste system. The existing sewage waste system draws material from the toilets of the airplane using a partial vacuum that is created in the waste tank. During a flushing cycle, waste material and air are drawn from the basin 7 and into the waste storage tank by the suction of the vacuum waste system.

An optional rinse line 12 leading from a rinse water supply (not shown) to the basin 7 may be included. An electrically operated rinse valve 13, which is interfaced with the flush control unit 10, is interposed in the rinse line 12. A vacuum breaker or anti-siphon valve 25 is provided on top of the rinse vale 13. In addition, a manual shut-off valve 14 is also interposed in the rinse line 12 upstream of the rinse valve 13, for use in case of failure of the rinse valve 13. The rinse line terminates in a spray nozzle 26 in the basin 7. Rinse fluid from the spray nozzle will rinse and cleanse the interior of the basin 7 upon opening of rinse valve 13. The rinse valve is typically opened after the basin 7 is emptied of the waste.

An air source (not shown) on the airplane is connected to the back side 15 of the enclosure 3 through a supply duct 16. The air source provides air at a high flow rate required during a flush to make up for air exhausted to the vacuum sewage system. An existing ventilation system (not shown) on an airplane may also be connected to the top side 5, inboard side or outboard side of the enclosure 3 through an exhaust duct 17. Except during a flushing cycle, the ventilation system continuously draws air from the airplane cabin and also the enclosure 3 to remove gases and odors and exhaust them to the exterior of the airplane. An optional pneumatic or mechanical check valve 18 may be coupled to the exhaust duct 17 to prevent the backflow of air into the enclosure 3 during a flush cycle.

A switch 24, which is mounted on the frame for the door 4, is activated when the door 4 is moved to a closed position. The switch is interfaced with the flush control unit to allow flushing to occur when the switch 24 is activated. When the door is in the open position and the switch 24 is deactivated, the flush control unit is signaled to prevent a flushing cycle.

Spillways 19 are positioned around the top of the basin 7 or in another suitable location to allow overflow waste to flow out of the basin and into the enclosure where it will remain within the enclosure 3 until it is removed during galley cleanup. The lower interior region of the base 20 of the enclosure 3 is sealed to a selected height to act as an overflow collector 21. The spillways 19 serve the dual purpose of addressing over flow and allowing makeup air from conduit 16 and the air source to enter the basin and fill the void caused by the exhausting of air and waste to the vacuum waste system during a flushing cycle.

A manually operated flush switch 22 is also interfaced with the flush control unit 10 in a conventional manner. An electrical power supply 23 supplies power to the flush control unit and the flush and water supply valves via appropriate power lines. When the flush switch 22 is activated, the flush control unit 10 cycles the flush valve 9 to an open position, thus initiating the flushing cycle. When the flush switch 22 is activated, the flush control unit 10 also cycles the rinse valve 13 to an open position when the basin is almost emptied of waste. When activated, the rinse valve 13 supplies nozzle 26 in the basin 7 with potable water from the water supply through the rinse line 12. Thus, with the flush valve 9 open, the waste, rinse water and air are transported through the drain line 8 and into the waste storage tank under the influence of the vacuum of the existing vacuum waste system.

Should an unforeseen circumstance lead to failure of the rinse valve 13 in the open position, the rinse line manual shut-off valve 14 can be used to close the rinse line 12. Furthermore, should an unforeseen circumstance lead to backflow of the waste into the basin 7, or should the flush valve 9 become stuck in the open position, the drain line manual shut-off valve 11 can be used to close the drain line 8.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A galley waste disposal system for use with an existing vacuum sewage waste storage tank of an existing sewage waste system, said waste storage tank being capable of being maintained under a partial vacuum, said galley waste disposal system comprising:

an enclosure for housing the system, the enclosure including a lower region and an upper region with a door for closing off the enclosure during a flush cycle;

a basin for receiving the waste material; the basin including a top portion; the basin being located within the enclosure upper region such that upon opening the door, the basin is exposed; a space being provided between the door and the basin top portion;

a drain line coupling the basin to the vacuum sewage waste storage tank;

a flush valve coupled to the drain line for allowing waste to be transported from the basin, through the drain line and into the storage tank via suction;

an air supply duct to supply air during a flushing cycle; wherein during use with the door closed, supply air passes from the air supply duct into the enclosure and enters the basin via the space between the basin top and the door.

2. The galley waste disposal system of claim 1, further comprising:

a flush control unit;

a manual switch for activating the flush control unit;

said flush valve being motorized and controlled by the flush control unit, said flush valve being opened when the manual switch is activated.

3. The galley waste disposal system of claim 2, further comprising:

a rinse line connecting the basin to a water supply;

a motorized rinse valve coupled to the rinse line, the rinse valve being interfaced with the flush control unit, the rinse valve being opened by the flush control unit when the manual switch is activated, whereby rinse water is supplied to the basin from the water supply through the rinse line.

4. The galley waste disposal system of claim 3, further comprising:

a rinse line shut-off valve coupled to the rinse line for manually closing the rinse line.

5. The galley waste disposal system of claim 1, further comprising:

an exhaust duct coupled to the enclosure for drawing air from the enclosure; and a check valve mounted in the exhaust duct for preventing the backflow of air during a flush cycle.

6. The galley waste disposal system of claim 1, further comprising:

a switch operatively associated with the door and interfaced with the flush control unit to prevent activation of the flush valve when the door is in an open position.

7. The galley waste disposal system of claim 1, wherein the space between the door and the basin top portion is formed as a spillway to allow any overflow material to pass through the spillway and drop into the lower region of the enclosure.

8. The galley waste disposal system of claim 7, wherein the interior surface of the lower region of the enclosure is sealed to a height of approximately four inches to act as a collector for the overflow material.

9. The galley waste disposal system of claim 1, further comprising:

a manual shut-off valve for manually closing the drain line.

* * * * *